United States Patent [19]
Nurnberg et al.

[11] 4,042,964
[45] Aug. 16, 1977

[54] MOTOR PROTECTION CIRCUIT

[75] Inventors: Richard K. Nurnberg, Norristown; Charles H. Perkins, Newtown Square, both of Pa.

[73] Assignee: Robertshaw Controls Company, Richmond, Va.

[21] Appl. No.: 640,676

[22] Filed: Dec. 15, 1975

[51] Int. Cl.$^2$ .............................................. H02H 7/08
[52] U.S. Cl. ...................................... 361/28; 361/156; 361/205
[58] Field of Search ................ 317/13 R, 13 A, 33 C, 317/36 TD, 33 R, 141 S, 142 R; 318/481, 484; 62/158; 335/164, 167; 361/23, 28, 29, 156, 205

[56] References Cited
U.S. PATENT DOCUMENTS

| | | | |
|---|---|---|---|
| 3,535,590 | 10/1970 | Mayer | 317/33 C X |
| 3,569,783 | 3/1971 | Nicolaisen | 317/13 R |
| 3,662,220 | 5/1972 | Riebs | 317/33 R X |
| 3,689,807 | 9/1972 | Tenenbaum | 317/141 S |
| 3,848,211 | 11/1974 | Russell | 337/64 |
| 3,916,211 | 10/1975 | DeVries | 317/151 X |
| B 451,396 | 4/1976 | Nurnberg | 317/146 X |

*Primary Examiner*—Harry E. Moose, Jr.
*Attorney, Agent, or Firm*—O'Brien & Marks

[57] ABSTRACT

Energization of a motor is controlled by a latching relay operated by switch means passing current from a capacitor to the winding of the relay. The capacitor is charged through a relatively large impedance unipolarity input.

9 Claims, 6 Drawing Figures 4,042,964

MOTOR PROTECTION CIRCUIT

BACKGROUND OF THE INVENTION

1. Field of the Invention

The invention relates to protection circuits for motors, such as compressor motors for refrigeration or air conditioning systems; and particularly to a protection circuit responsive to a condition, such as a loss of a lubricating oil pressure for more than a predetermined duration, for stopping the operation of the motor.

2. Description of the Prior Art

The prior art, as exemplified in U.S. Pat. Nos. 3,290,576, 3,599,439, 3,673,811, 3,753,043, and 3,787,793, contains a number of motor protection circuits which are responsive to loss of lubricating oil pressure for more than a predetermined duration to stop a motor. U.S. Pat. No. 3,848,211 discloses a latching electrical switch construction. The prior art also contains a variety of motor protection circuits, timing circuits or control circuits such as are described in U.S. Pat. Nos. 3,102,677, 3,435,298, 3,638,091, 3,648,074, 3,652,916, 3,681,671, 3,688,130, 3,694,669, 3,712,991, 3,716,756, 3,749,992, 3,769,529, 3,796,061 and 3,801,889. The prior art motor controls have one or more deficiencies such as being excessively costly, not being usable on different voltage supplies, being restricted to a limited sequence of motor controls, being relatively unreliable, not being readily adjustable when installed, etc.

SUMMARY OF THE INVENTION

The invention is summarized in a protection circuit unit for controlling an energization circuit for a motor wherein the protection circuit unit includes a relay having a winding, contact means for controlling the energization circuit, means responsive only to a current in the winding greater than a predetermined current for operating the contact means, latching means for maintaining the contact means in an operated position after termination of the predetermined current, and resetting means for returning the contact means to the unoperated position; unipolarity voltage input means including an impedance having a value sufficient to limit current through the input means to substantially less than the predetermined current; a capacitor connected across the unipolarity input means; switch means connected in series with the winding across the capacitor; said capacitor having a value sufficient to produce a momentary current through the winding exceeding the predetermined current at a minimum supply voltage when the switch means is closed; and condition sensing means for operating the switch means.

An object of the invention is to produce a reliable motor protection circuit unit which is substantially reduced in cost by eliminating the need for components, such as a transformer, a rectifier bridge, and zener diodes.

Another object of the invention is to construct a protection circuit unit including a timing circuit which may be adjusted when installed in a system employing the motor protection circuit.

It is also an object of the invention to provide a motor protection circuit unit which can be used with a variety of supply voltages such as 120 volts, 208 volts and 240 volts; thus eliminating the need to have in stock separate controls for separate supply voltages.

One advantage of the invention is that the motor protection circuit unit can be installed anywhere in a sequence of motor controls whereas the prior art protection circuit units were much more limited.

Another feature of the invention is that an external indicator can be energized to indicate a tripped condition of the controls.

Other objects, advantages and features of the invention will become apparent from the following description of the preferred embodiment when taken in conjunction with the accompanying drawings.

DESCRIPTION OF THE PREFERRED EMBODIMENT

Figure 1:
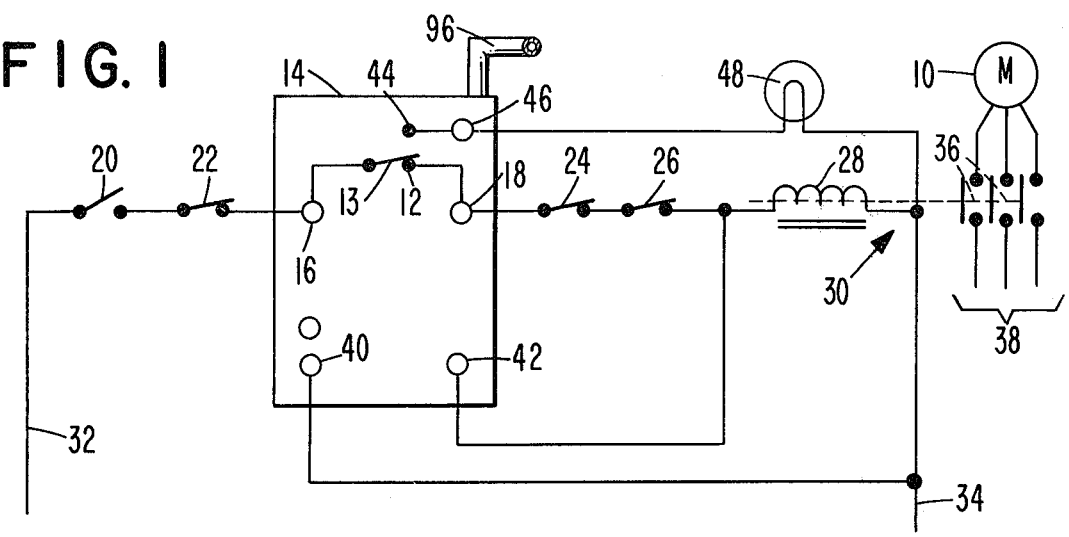
FIG. 1 is a diagram of a motor control circuit in accordance with the invention.

As shown in FIG. 1, a protection circuit for a motor, such as a compressor motor 10 for a refrigeration or air conditioning system, includes a contact means, such as a contact arm 13 and a normally closed contact 12 of a protection circuit unit 14 between terminals 16 and 18 of the unit 14, and various operating or safety control switches 20, 22, 24, and 26 connected in series with a winding 28 of a motor contactor, indicated generally at 30, across a pair of power lines 32 and 34. The contactor 30 includes normally open contacts 36 closable by energization of the winding 28 and connected in series with input lines from an AC power source 38 to inputs of the motor 10. The power lines 32 and 34 may be connected across a phase of the power source 38 or may be connected to another suitable power source. The circuit unit 14 has a terminal 40 connected to the line 34 and a terminal 42 connected to the junction between the contactor winding 28 and the switch 26 on the opposite side of the winding 28 from the power line 34. A normally open contact 44, connectable with the contact arm 13 joined to terminal 16 in the unit 14, is connected to a terminal 46 of the unit 14. An indicator, such as a lamp 48, is connected between the terminal 46 and the line 34.

Figure 2:
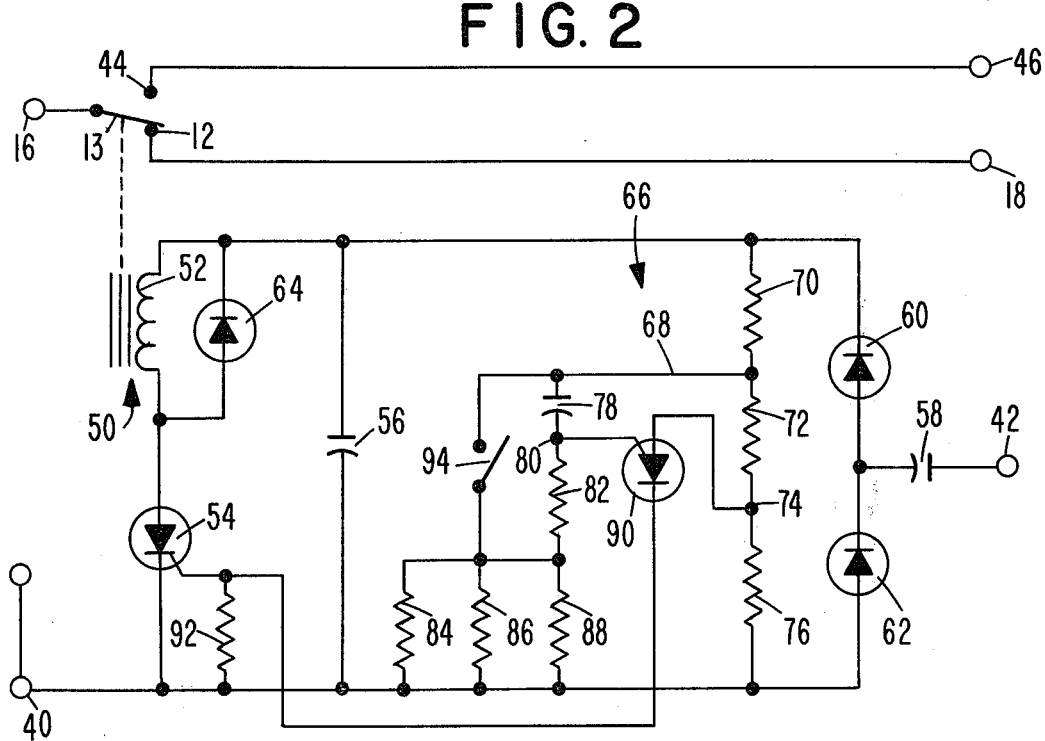
FIG. 2 is a detail diagram of the circuitry in a protection unit of the circuit of FIG. 1.

In the circuit unit 14 as shown in FIG. 2, the contact arm 13 and the contacts 12 and 44 are part of a latching relay indicated generally at 50 which has a winding 52 connected in series with switch means, such as the anode and cathode of a silicon controlled rectifier (SCR) 54, across a capacitor 56 which has one plate connected to the terminal 40. The cathode of the SCR 54 is also connected to the terminal 40. A capacitor 58 is connected between the terminal 42 and a junction between the anode and cathode of respective diodes 60 and 62. The cathode of the diode 60 is connected to the other plate of the capacitor 56 while the anode of the diode 62 is connected to the terminal 40. A diode 64 is connected across the winding 52 such as to pass current upon collapse of the magnetic field of the winding 52.

The capacitor 58 has a sufficiently small value to result in an impedance which is relatively large to limit the current through diode 60 to less than that necessary to energize the relay 50. The capacitor 56 has a value sufficiently large, much larger than capacitor 58, to store a charge great enough to produce a momentary current in the winding 52 sufficient to operate the relay 50 at a minimum voltage applied across the terminals 40 and 42, such as 100 volts.

A condition sensor or a circuit responsive to the absence of oil pressure for more than a predetermined duration includes a bridge circuit indicated generally at 66 having a power node 68 connected by a resistance 70 to the junction between the diode 60 and the capacitance 56 and with its other power node on the terminal 40. A resistance 72 is connected between the node 68 and the sensing node 74 while a resistance 76 is connected between the terminal 40 and the node 74. A timing capacitance 78 is connected between the node 68 and the other sensing node 80. A resistance 82 has one end connected to the sensing node 80 with the other end of the resistance 82 connected by a timing resistance formed by three parallel resistances 84, 86, and 88 to the other power node on the terminal 40. The resistances 84, 86 and 88 are selected so that one or two of the resistances 84, 86 and 88 may be removed to give varying times of charge for the capacitance 78. A semiconductor voltage sensing device such as a programmable unijunction transistor 90 has its gate electrode connected to the sensing node 80 and its anode electrode connected to the sensing node 74. The cathode electrode of the PUT 90 is connected to the gate electrode of the SCR 54 which is normally biased by the resistance 92 connected to the terminal 40. A normally open oil pressure responsive switch 94 closed by adequate lubricating oil pressure in capillary line 96 (FIG. 1), is connected across the node 68 to the junction between the resistance 82 and the resistances 84, 86 and 88. The resistance 82 has a value selected to give the desired discharge time to the charge on the capacitance 78 when the switch 94 is closed. The resistance 70 has a value sufficiently large to drop the voltages in the bridge circuit 66 to within the voltage rating of the PUT 90; for input voltages of 100-300 volts, the value of resistance 70 should be substantially larger than the resistance of the bridge circuit 66.

Figure 3:
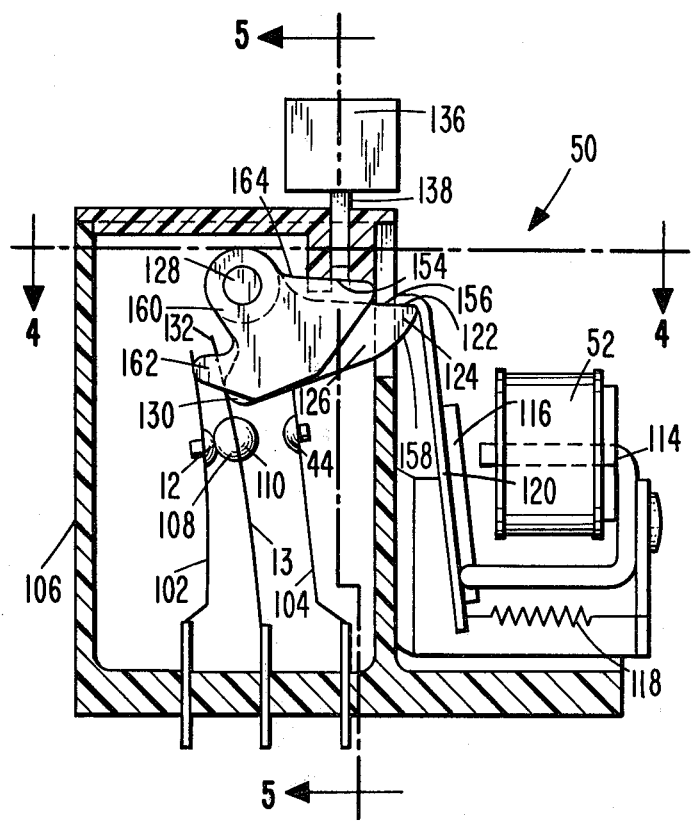
FIG. 3 is a cross sectional elevation view of a latching relay of the circuitry of FIG. 2.

In the relay 50 as illustrated in FIG. 3 the contacts 12 and 44 are mounted on respective resilient spring arms 102 and 104 which are suitably mounted at one end in the base of an insulative housing 106. The contacts 12 and 44 are mounted toward the free ends of the arms 102 and 104. The arm 13 is mounted at one end in the housing 106 between the arms 102 and 104 and has contacts 108 and 110 mounted toward its other end in alignment with the respective contacts 12 and 14. The contact arms 13 and 102 are formed to be biased to spaced apart positions such that the contacts 12 and 108 are separated while the contact arm 104 is biased toward the contact arm 13 such that the contact 44 engages the contact 110 when the contact arm 13 is released.

The winding 52 is wound upon one leg of a U-shaped core 114 which has an armature 116 pivotally mounted for movement closing and opening the open end of the core 114. The armature 116 is normally biased away from the open end of the core 114 by a spring 118. A latch member 120 is mounted on the armature 116 and has an upper end 122 bent into an L-shape or hook shape such that it is adapted to engage and latch a projecting point 124 of a first cam member 126 rotatably mounted on a shaft 128 fixed in the housing 106. The cam 126 has an abutment or a lobe 130 adapted to engage against an upward extending portion 132 of the arm 13 such as to hold the spring blade 13 to the left, as viewed in FIG. 3, when the cam member 126 is maintained in a clockwise rotated position by the latch member 120 so as to maintain the contact 108 in electrical engagement with the contact 12 on the resilient arm 102 and to hold the contact 110 out of engagement with the contact 44 on the arm 104. The resilient force of the spring arms 13 and 102 urge the cam 126 to rotate about the shaft 128 engaging the projection point 124 upward against the hooked end 122 of the latch member 120.

A reset button 136 has a rectangular shank portion 138 which is slidable within a slot 140 formed in the cover of the housing 106. The shank portion 138 has a pair of oppositely extending projections 142 and 144 for engaging the lower side of the housing cover adjacent the slot 140 such as to retain the button on the cover. Also the projections 142 and 144 extend into grooves 146 and 148 in extending portions 150 and 152 of the housing on opposite sides of the shank portion 138 such as to guide the shank portion 138. An end 154 of the shank portion 138 extends above an upper surface 156 extending along a radius from the axis of rotation to the point 124 of the cam member 124. The end 154 has a length designed to engage the surface 156 when the push button 136 is depressed to rotate the cam 126 sufficiently clockwise to allow the projecting point 124 to be latched by the hooked end 122 of the latch member 120. The cam 126 has a cam surface 158 extending downward and at an angle to the surface 156 for camming the hooked end 122 to the right when the cam 126 is rotated clockwise.

Another cam member 160 is also rotatably mounted on the shaft 128 and is spaced therefrom by suitable spacers. The cam 160 has an abutment or lobe 162 for engaging against the upper end of the spring arm 102 in the manner illustrated in FIG. 3. The cam member 160 has a surface 164 extending radially from its axis of rotation and is adapted to also be engaged by the end 154 of the shank 138 when the push button 136 is depressed downward. The cam member 160 has an arcuate width between the surface 164 and the abutment 162 which is sufficiently greater than the arcuate width between the surface 156 and the abutment 130 of the cam member 126 to hold the arm 102 and the contact 12 spaced from the contact 108 and the arm 13 when the push button 136 is depressed. It is noted that the upward extending portion 132 of the arm 13 leaves a space above the upper end of the arm 13 for accommodating the cam member 160. Similarly the upper end of the arm 104 is sufficiently short to allow free movement of the cam members 126 and 160.

In operation of the motor control circuit of FIG. 1 the contactor winding 28 is initially energized by closing a control switch, such as the thermostat switch 20, to complete a circuit path from power lines 32 and 34 through the contacts 20, 22, 24, 26 and the contact 12 in the unit 14. The energization of the contactor winding 28 closes the contactor contacts 36 operating the motor 10. In the event that oil lubricating pressure to the motor 10 or the compressor as transmitted in the line 96 fails to reach a selected pressure within a predetermined duration, the unit 14 operates to open the contact arm 13 from the contact 12 thus de-energizing the contactor winding 28. Also the contact arm 13 engages the normally open contact 44 completing the circuit through the indicator 48 indicating that the unit 14 has operated and that the oil pressure is insufficient.

More particularly, the energization of the motor contactor winding 28 produces a line voltage thereacross which is applied to the respective terminals 40 and 42. As shown in FIG. 2 the line voltage on terminal 42 passes through the capacitor 58 and is rectified by the diode 60 to provide incremental pulses charging the capacitor 56 during positive half cycles of the signal on the terminal 42. During negative half cycles, the diode 62 conducts to place a positive charge on the plate of the capacitor 58 connected to the diodes 60 and 62. The voltage across the capacitor 56 is dropped by the resistance 70 and applied across the power input nodes 68 and 46 of the timing bridge circuit. Initially the capacitance 78 does not have any charge thereon and the gate electrode of the PUT 90 is held positive with respect to the anode electrode connected to the sensing node 74 thus maintaining the PUT 90 non-conductive. When the oil pressure rises sufficiently the switch 94 closes thus shunting the capacitance 78 and completing a closed loop circuit through the capacitance 78, the resistance 82 and the switch 94 preventing the charging of the capacitance 78 as well as dissipating any charge which may have accumulated on the capacitance. In the event that the oil pressure does not rise sufficiently to close the switch 94, the capacitance 78 charges after a duration determined mainly by the values of the resistances 84, 86 and 88 and the capacitance 78 to render the gate electrode of the PUT 90 negative with respect to its anode electrode to thus render the PUT 90 conductive. The conduction of the PUT 90 applies a positive signal to the gate electrode of the SCR 54 completing a circuit path through the winding 52. The charge on the capacitor 56 produces a current through the winding 52 sufficient to operate the relay 50.

Figure 4:
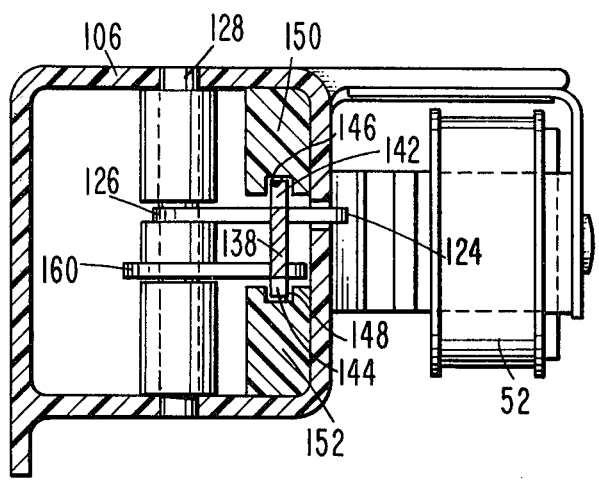
FIG. 4 is a cross section view taken along line 4—4 of FIG. 3.
Figure 5:
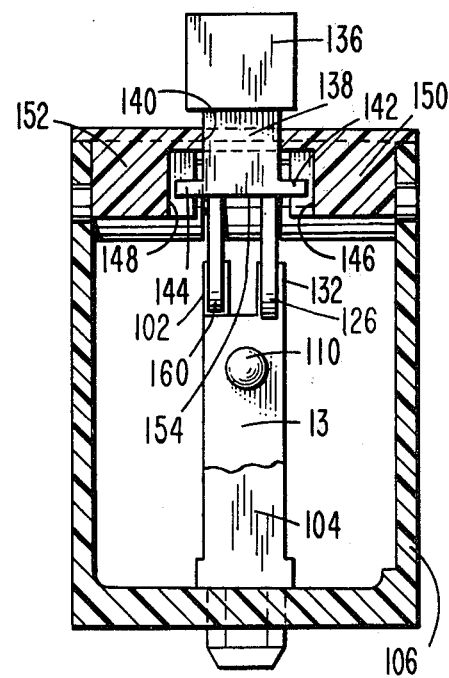
FIG. 5 is a cross section view taken along line 5—5 of FIG. 3.

Referring to FIGS. 3, 4 and 5 when the winding 52 is energized by sufficient current, the armature 116 is attracted to the core 114 against the spring bias 118 to disconnect the hooked end 122 from the projection 124 of the cam member 126. This allows the cam member 126 to rotate counter-clockwise under the force of the spring arms 13 and 102 thus allowing the spring arm 13 to disengage the contact 108 from the contact 12 and to engage the contact 110 with the contact 44 on the spring arm 44. The relay 50 remains in this position after termination of the energization of the winding 52 until the relay is reset by depressing the push button 136 which rotates the cam members 126 and 160 clockwise engaging the spring arms 102 and 13 to move them to the left as illustrated in FIG. 3 and to engage the camming surface 158 with the end 122 of the latching member 120 camming the latching member until the hooked end 122 slips over the projection 124 to secure the cam member 126 in its clockwise rotated position as shown in FIG. 3. The lobe 162 of the cam member 160 holds the contact arm 102 such that the contact 12 is disengaged from the contact 108; this prevents subversion of the protection unit by taping down the push button 136. Upon release of the push button 136 the spring force of the arm 102 rotates the cam member 160 back upward and engages the contact 12 against the contact 108 re-establishing the circuit connection for the contactor winding 28, FIG. 1.

The utilization of the discharge of the capacitor 56 to energize the winding 52 permits a wide variation of input voltages, such as voltages from 100 volts to 300 volts. At higher voltages, relays adapted to be energized by the lower voltages conduct excessive currents which after a duration can damage their windings, and at lower voltages, current in windings adapted to be energized at higher voltages is insufficient to energize the windings. However, the windings of relays adapted to be energized by lower voltages can conduct momentary excessive currents without damage; thus the momentary current produced by the charge on the capacitance 56 through the relay winding 52 allows the use of the control circuit unit 14 with widely varying input voltages whereas the prior art motor protection circuits required separate units to operate on the different voltages.

The large impedance presented by the capacitor 58 insures that insufficient current flows through the diode 60 to damage the winding 52 at higher voltages. The utilization of the capacitance 58 with the voltage doubling arrangement of diodes 60 and 62 offers an advantage over similar resistive impedances in that capacitor 58 provides better isolation against voltage surges particularly those attributed to static discharges and the like.

The utilization of the bridge timing circuit 66 also renders the circuit less subject to variation from input voltages due to the balancing effect of the opposite arms of the bridge circuit 66. Lesser rates of charge for the timing capacitance 78 due to lower supply voltages are balanced by a lesser voltage across the resistance 72, thus the timing is substantially the same as for higher supply voltages.

By forming the timing resistance from a plurality of parallel resistances 84, 86 and 88, one or more of the resistances may be disconnected to allow for the timing to be changed to fit the particular application.

Figure 6:
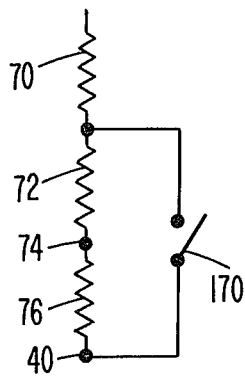
FIG. 6 is a detail circuit diagram of a modification of the circuitry of FIG. 2.

In a modification of FIG. 6 a switch 170 is connected across the resistances 72 and 76 thus preventing the sensing node 74 from going positive with respect to the junction 40. The switch 170 may be selectively closed to disable the timing function in the oil protection circuit unit in the event that it is not desired in the motor protection system.

Since many modifications, variations and changes in detail may be made to the presently described embodiment, it is intended that all matter in the foregoing description and in the accompanying drawings be interpreted as illustrative and not in a limiting sense.

What is claimed is:

1. A protection circuit unit for controlling an energization circuit for a motor, the protection circuit unit comprising
   a relay having a winding, contact means for controlling the energization circuit, means responsive only to a current in the winding greater than a predetermined current for operating the contact means, latching means for maintaining the contact means in a operated position after termination of the predetermined current, and resetting means for returning the contact means to the unoperated position;
   a first capacitor;
   a pair of AC voltage input terminals;
   one of said pair of AC voltage terminals connected to one side of the first capacitor;
   a pair of diodes serially connected with the same polarity across the first capacitor;
   a second capacitor having one side connected to the junction between the pair of diodes;
   said second capacitor having its other side connected to the other of the pair of AC voltage terminals and having an impedance value sufficient to limit current through the input terminals to substantially less than the predetermined current;

switch means connected in series with the winding across the first capacitor;

said first capacitor having a capacitance value greater than the second capacitor and sufficient to produce a momentary current through the winding exceeding the predetermined current at a minimum supply voltage when the switch means is closed; and condition sensing means for operating the switch means.

2. A protection circuit unit as claimed in claim 1 wherein the condition sensing means includes a bridge timing circuit having power input nodes connected across the first capacitor, semiconductor means connected across the sensing nodes of the bridge circuit, a timing capacitance in a first arm of the bridge circuit;

first, second and third resistances in the respective second, third and fourth arms of the bridge circuit, said second arm being in series with the first arm across the power input nodes whereby the first resistance forms a timing resistance, and said semiconductor means having an output operating the switch means.

3. A protection circuit unit as claimed in claim 2 including an oil pressure responsive switch connected across the timing capacitance for preventing the charging of the timing capacitance.

4. A protection circuit unit as claimed in claim 3 wherein the timing resistance includes a plurality of parallel resistances which are adapted to be selectively removed from the circuit unit to allow for adjustment of the timing.

5. A protection circuit unit as claimed in claim 3 including a fourth resistance connected in series with the power input nodes across the first capacitor, said fourth resistance having a valve substantially larger than the second and third resistances.

6. A protection circuit unit as claimed in claim 1 wherein the relay includes a pair of spring contact arms supported at one ends thereof and with the other ends of the arms normally biased apart, a pair of contacts mounted on the respective pair of arms toward the other ends, a rotatable cam member for camming one of the spring contact arms to bring the pair of contacts into engagement, a latch member biased into engagement with the cam member to hold the cam member in a rotated position securing the contacts in engagement, armature means for moving the latch member against its bias to disengage the latch member from the cam member upon energization of the winding by the predetermined current, and push button means for rotating the cam to its rotated position.

7. A protection circuit unit as claimed in claim 6 wherein the relay includes a third spring contact arm supported at one end, a third contact mounted on the one spring contact arm toward its other end, a fourth contact mounted on the third spring contact arm toward its other end, said one and third spring contact arms being normally biased to close the third and fourth contacts, said cam member holding the third and fourth contacts open when in its rotated position, said third and fourth contacts adapted to complete an indicating circuit.

8. A protection circuit unit as claimed in claim 7 including a second rotatable cam member engageable by the pushbutton means for camming the other of the pair of spring contact arms to hold the pair of contacts open when the pushbutton means is depressed.

9. A protection circuit unit as claimed in claim 1 including disable switch means for selectively disabling the protection circuit unit.

* * * * *